United States Patent
Yang et al.

(10) Patent No.: US 12,067,856 B2
(45) Date of Patent: Aug. 20, 2024

(54) APPARATUS AND METHOD FOR DETECTING SMOKE BASED ON MULTIPLE WAVELENGTHS

(71) Applicant: Electronics and Telecommunications Research Institute, Daejeon (KR)

(72) Inventors: Hoe Sung Yang, Daejeon (KR); Soo Cheol Kim, Daejeon (KR); Hyun Seok Kim, Daejeon (KR); So Yung Park, Daejeon (KR); Kang Bok Lee, Daejeon (KR); Kwang Soo Cho, Daejeon (KR); Kyu Won Han, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 150 days.

(21) Appl. No.: 17/865,566

(22) Filed: Jul. 15, 2022

(65) Prior Publication Data

US 2023/0206742 A1 Jun. 29, 2023

(30) Foreign Application Priority Data

Dec. 23, 2021 (KR) .................. 10-2021-0186330

(51) Int. Cl.
*G08B 17/10* (2006.01)
*G01N 21/27* (2006.01)
(Continued)

(52) U.S. Cl.
CPC .......... *G08B 17/107* (2013.01); *G01N 21/27* (2013.01); *G01N 21/534* (2013.01); *G01N 2015/0046* (2013.01)

(58) Field of Classification Search
CPC .... G08B 17/107; G08B 29/185; G01N 21/27; G01N 21/534; G01N 2015/0046;
(Continued)

(56) References Cited

U.S. PATENT DOCUMENTS 9,092,959 B2 7/2015 Kim et al.
9,915,609 B1* 3/2018 Erdtmann .............. G01N 21/53
(Continued)

FOREIGN PATENT DOCUMENTS

JP 2005-115970 A 4/2005
KR 10-1819997 B1 1/2018
(Continued)

OTHER PUBLICATIONS

Xiao, Xiao, et al. "A Method for Fire Detecting by Volume and Surface Area Concentration Based on Dual Wavelengths." *The 2017 Suppression, Detection, and Signaling Research and Applications Conference (SUPDET 2017) was jointly organized with the 16th International Conference on Fire Detection (AUBE '17)*. Sep. 2017. pp 1-8.

(Continued)

*Primary Examiner* — Anh V La
(74) *Attorney, Agent, or Firm* — NSIP Law

(57) ABSTRACT

A smoke detection apparatus based on multiple wavelengths is provided, which includes: a chamber configured to receive an inflow of a smoke; a detector including a light emitter having a plurality of light sources that radiate light having a plurality of different wavelengths into a space in the chamber, and a light receiver configured to receive scattered light by the plurality of light sources; and a controller configured to control an operation of the detector and to distinguish between fire smoke and non-fire quasi-smoke by detecting and analyzing a light receiving signal of the light receiver.

16 Claims, 22 Drawing Sheets

(51) Int. Cl.
*G01N 21/53* (2006.01)
*G08B 17/107* (2006.01)
*G01N 15/00* (2006.01)

(58) Field of Classification Search
CPC .... G01N 15/075; G01N 15/06; G01N 21/314; G01N 21/53; G01N 2021/3148
USPC ............. 340/630, 628, 632, 627, 603
See application file for complete search history.

(56) References Cited

U.S. PATENT DOCUMENTS

| | | | |
|---|---|---|---|
| 10,339,778 B1* | 7/2019 | Birnkrant | G01N 21/534 |
| 10,685,546 B2* | 6/2020 | Duric | G01J 1/08 |
| 2021/0088442 A1* | 3/2021 | Dohi | G08B 17/107 |
| 2021/0123864 A1 | 4/2021 | Yang et al. | |
| 2021/0350684 A1* | 11/2021 | Nagashima | G08B 17/06 |
| 2022/0050039 A1* | 2/2022 | Vidulich | G01N 15/0211 |
| 2022/0276163 A1* | 9/2022 | Cheung | G08B 17/107 |

FOREIGN PATENT DOCUMENTS

| | | |
|---|---|---|
| KR | 10-2019-0072439 A | 6/2019 |
| KR | 10-1963111 B1 | 7/2019 |
| KR | 10-2020-0095547 A | 8/2020 |
| KR | 10-2021-0049661 A | 5/2021 |
| KR | 10-2275994 B1 | 7/2021 |

OTHER PUBLICATIONS

Richardson, David, et al. "Investigation of the Potential Use of Blue Light in Forward Scattering Optical Smoke Chambers to Detect all UL217 Fires in the New Standard." *The 2017 Suppression, Detection, and Signaling Research and Applications Conference (SUPDET 2017) was jointly organized with the 16th International Conference on Fire Detection (AUBE '17)*. Sep. 12-14, 2017. pp 1-10.

* cited by examiner

LED 1 (FIRST WAVELENGTH): 380 ~ 480nm
LED 2 (SECOND WAVELENGTH): 600 ~ 700nm
LED 3 (THIRD WAVELENGTH): 850 ~ 950nm
PHOTODIODE: 380 ~ 950nm

LED 1 (FIRST WAVELENGTH): 380 ~ 480nm
LED 2 (SECOND WAVELENGTH): 600 ~ 700nm
LED 3 (THIRD WAVELENGTH): 850 ~ 950nm

PD 1 (FIRST WAVELENGTH): 380 ~ 480nm
PD 2 (SECOND WAVELENGTH): 600 ~ 700nm
PD 3 (THIRD WAVELENGTH): 850 ~ 950nm

LED 1 (FIRST WAVELENGTH): 380 ~ 480nm
LED 2 (SECOND WAVELENGTH): 600 ~ 700nm
LED 3 (THIRD WAVELENGTH): 850 ~ 950nm
SPECTROMETER: 380 ~ 950nm

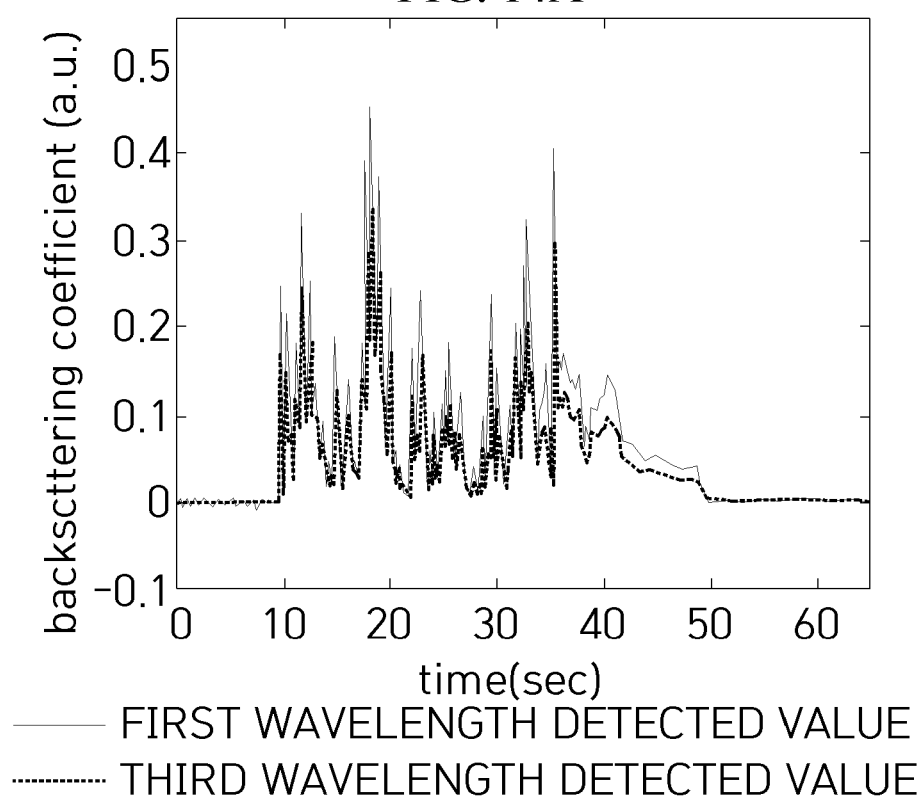

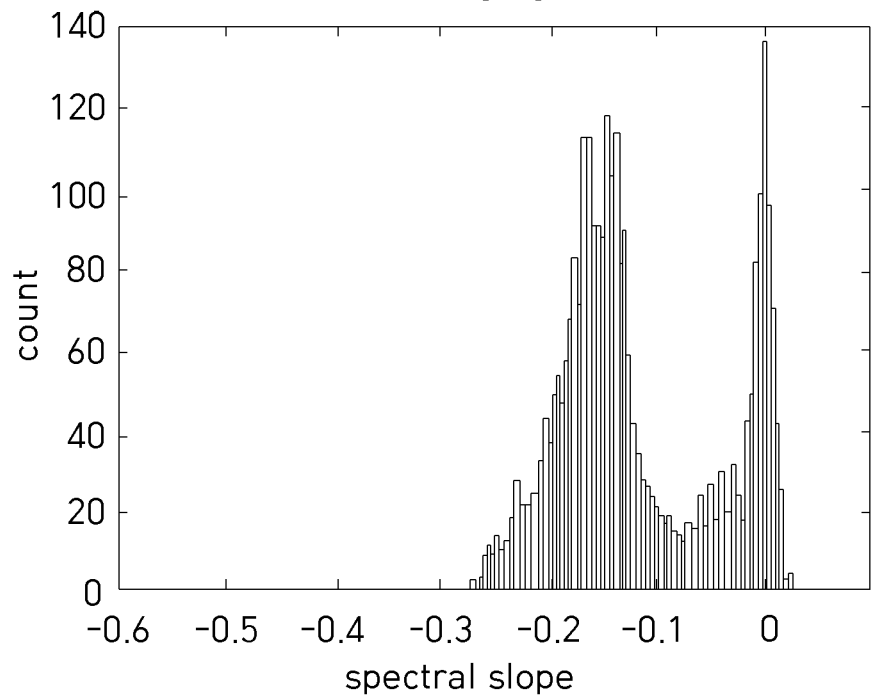

FIRE SMOKE C

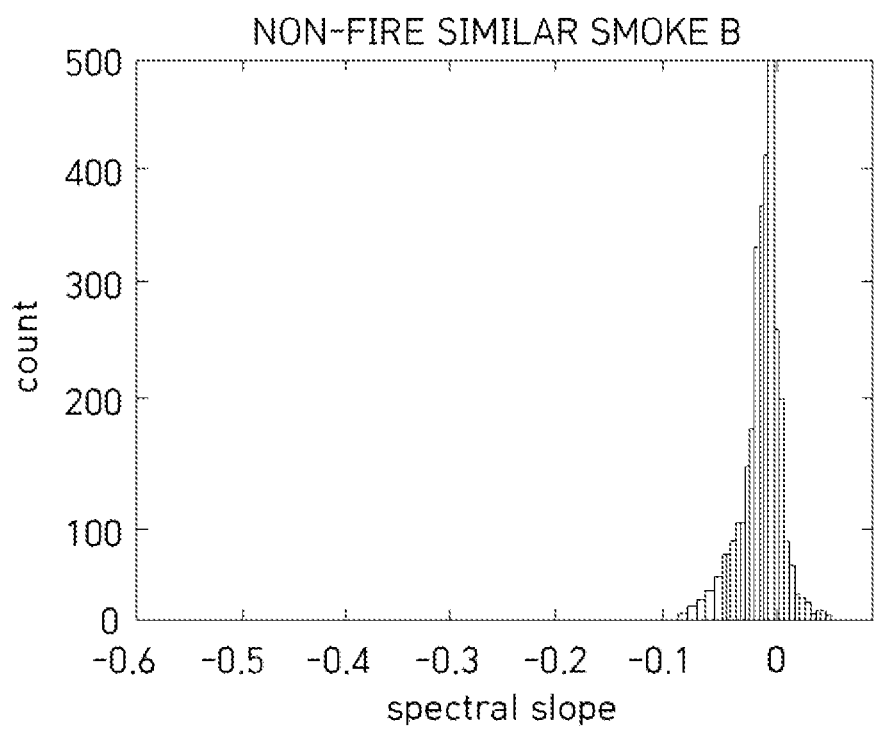

APPARATUS AND METHOD FOR DETECTING SMOKE BASED ON MULTIPLE WAVELENGTHS

CROSS-REFERENCE TO RELATED APPLICATION

This application claims priority to and the benefit of Korean Patent Application No. 10-2021-0186330, filed on Dec. 23, 2021, the disclosure of which is incorporated herein by reference in its entirety.

BACKGROUND

1. Technical Field

The present disclosure relates to an apparatus and a method for detecting smoke based on multiple wavelengths.

2. Related Art

A general fire detector is a device that determines whether a fire occurs by detecting heat and smoke occurring when the fire occurs. Such a fire detector may be classified into a heat detection type and a smoke detection type.

The heat detection type may be classified into a fixed temperature type that detects as a fire when an ambient temperature of a detector rises above a predetermined level, and a differential type that operates when a temperature increase rate exceeds a threshold value.

Further, the smoke detection type may be classified into an ionization type that measures a change of an ionic current value caused by the smoke, and a photoelectric type that detects light scattering caused by smoke particles.

Meanwhile, for rapid detection of the fire, the use of a photoelectric type fire detector is increasing. Such a photoelectric type fire detector has a structure in which in case that smoke flows into a chamber provided inside the detector, and light is scattered by an inflow of smoke particles, the detector detects the scattered light, and generates a fire alarm.

However, the photoelectric fire detector in the related art has a problem in that the detector determines that the fire has occurred, and generates an unwanted alarm frequently in case of not only an inflow of the actual smoke but also an inflow of non-fire fine particles, such as cooking smoke, cigarette smoke, water vapor, and fine dust, which may occur in everyday life.

Such a false alarm caused by the unwanted alarm may cause a fire station to be mistakenly dispatched to waste the administrative power, and cause common people to react insensitively even if the alarm is generated. Further, they may even turn off a fire receiver in order to avoid the false alarm, and when the actual fire occurs, the fire receiver does not operate to cause serious personal injury and property damage.

SUMMARY

In order to solve the above problem, the present disclosure proposes a photoelectric type fire detector which can detect a fire by using the characteristic of light scattering against smoke particles, and particularly, the disclosure proposes an apparatus and a method for detecting smoke based on multiple wavelengths, which have a function capable of distinguishing between fire smoke and non-fire quasi-smoke by using the characteristic that reactivity of the smoke particles is changed depending on wavelengths of light.

However, problems to be solved by the present disclosure are not limited to the above-described problem, and other problems may exist.

In a first aspect of the present disclosure to solve the above problem, a smoke detection apparatus based on multiple wavelengths includes: a chamber configured to receive an inflow of a smoke; a detector including a light emitter having a plurality of light sources that radiate light having a plurality of different wavelengths into a space in the chamber, and a light receiver configured to receive scattered light by the plurality of light sources; and a controller configured to control an operation of the detector, and to distinguish between fire smoke and non-fire quasi-smoke by detecting and analyzing a light receiving signal of the light receiver.

Further, in a second aspect of the present disclosure, a method performed by a smoke detection apparatus based on multiple wavelengths includes: controlling periodic blinking of a light emitter configured to radiate light having a plurality of different wavelengths into a space in a chamber configured to receive an inflow of smoke to be distinguished; controlling a light receiver to receive scattered light by the smoke to be distinguished, having flowed into the chamber; and distinguishing the smoke to be distinguished as any one of fire smoke and non-fire quasi-smoke by detecting and analyzing a light receiving signal of the light receiver.

In another aspect of the present disclosure to solve the above problem, a computer program executes a smoke detection method based on multiple wavelengths in combination with a hardware computer, and is stored in a computer-readable recording medium.

Other detailed matters of the present disclosure are included in the detailed description and drawings.

According to an embodiment of the present disclosure described above, through the smoke detection apparatus and method having the function of distinguishing between the fire and the non-fire, the false alarm caused by the unwanted alarm due to the life smoke can be reduced, and thus firefighters can be prevented from being mistakenly dispatched.

Effects of the present disclosure are not limited to those described above, and other unmentioned effects will be able to be clearly understood by those of ordinary skill in the art from the following description.

BRIEF DESCRIPTION OF THE DRAWINGS

FIGS. 14A to 14D are diagrams illustrating an example of a data processing procedure for determining whether a fire occurs.

FIGS. 15A to 15F are diagrams illustrating an example of distribution characteristics of a histogram illustrated in FIG. 14 depending on a fire and a non-fire.

DETAILED DESCRIPTION

Figure 1:
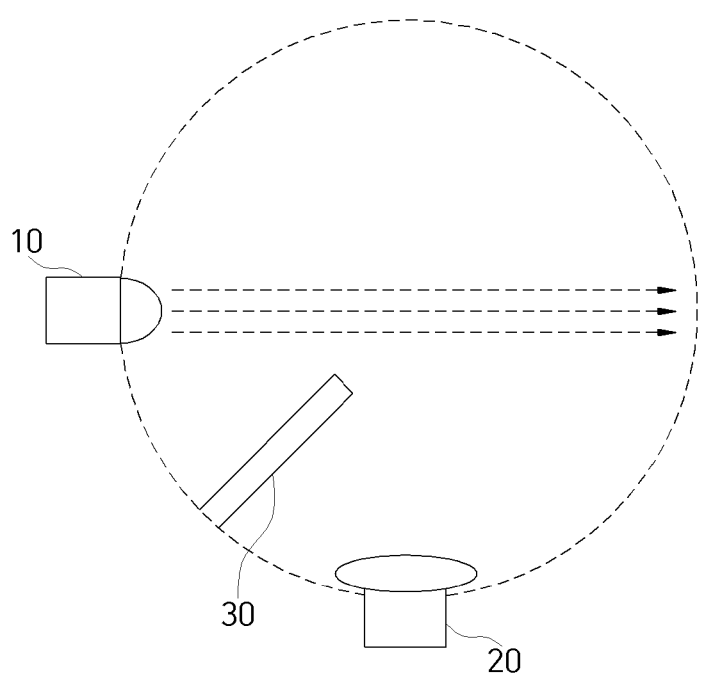
FIG. 1 is a diagram schematically explaining a general photoelectric type fire detector in the related art.

The aspects and features of the present disclosure and methods for achieving the aspects and features will be apparent by referring to the embodiments to be described in detail with reference to the accompanying drawings. However, the present disclosure is not limited to the embodiments disclosed hereinafter, and it can be implemented in various different forms. However, the embodiments are provided to complete the present disclosure and to assist those of ordinary skill in the art in a comprehensive understanding of the scope of the technical idea, and the disclosure is only defined by the scope of the appended claims.

Terms used in the description are to explain the embodiments, but are not intended to limit the present disclosure. In the description, unless specially described on the contrary, the constituent element(s) may be singular or plural. In the description, the term "comprises" and/or "comprising" should be interpreted as not excluding the presence or addition of one or more other constituent elements in addition to the mentioned constituent elements. Throughout the whole description, the same reference numerals are used to indicate the same constituent elements, and the term "and/or" includes each of the mentioned constituent elements and all combinations of one or more thereof. The terms "first", "second", and so forth are used to describe various constituent elements, but these constituent elements should not be limited by the terms. The above-described terms are used only for the purpose of discriminating one constituent element from another constituent element. Accordingly, the first constituent element to be mentioned hereinafter may be the second constituent element in the technical idea of the present disclosure.

Unless otherwise defined, all terms (including technical and scientific terms) used in the description may be used as the meaning that can be commonly understood by those skilled in the art to which the present disclosure pertains. Further, unless clearly and specially defined, the terms defined in generally used dictionaries should not be interpreted ideally or excessively.

Hereinafter, to help understanding of those skilled in the art, backgrounds in which the present disclosure is proposed will be first described, and then, embodiments of the present disclosure will be described.

Figure 2:
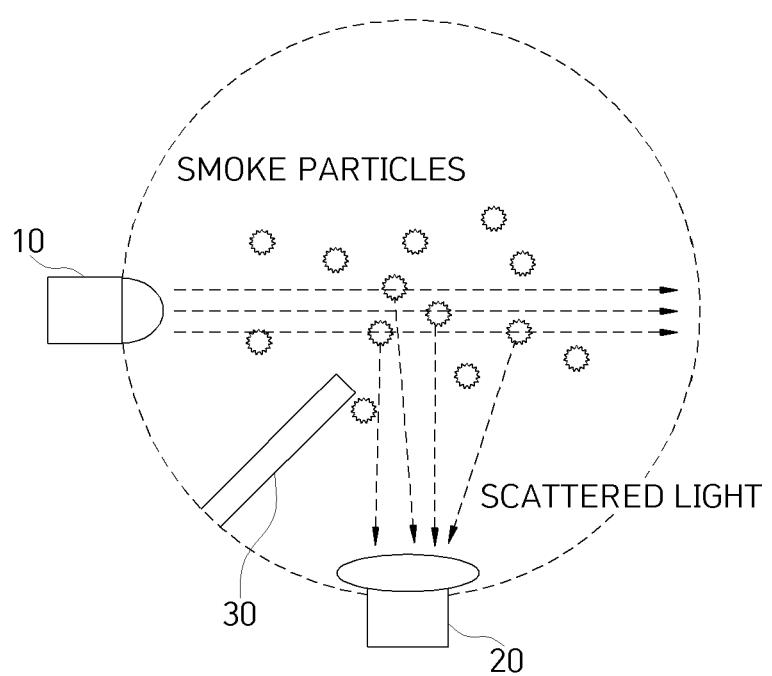
FIG. 2 is a diagram explaining that the photoelectric type fire detector operates when smoke particles flow into the detector.

FIG. 1 is a diagram schematically explaining a general photoelectric type fire detector in the related art. FIG. 2 is a diagram explaining that the photoelectric type fire detector operates when smoke particles flow into the detector.

The photoelectric type fire detector in the related art is configured to include an infrared light emitter 10 and a light receiver 20, and has a structure in which if light of the light emitter 10 is input to the light receiver 20, the fire detector reacts to the light.

In a chamber, a shading wall 30, the light emitter 10 and the light receiver 20 are inconsistently arranged to maintain predetermined angles, and in a general environment in which smoke particles do not flow, they are structured that light from the light emitter 10 is not detected by the light receiver 20.

As described above, the inner chamber of the photoelectric type fire detector in the related art is structured so that the light emitter 10 does not interfere with the light receiver 20 in an environment in which the smoke particles are not present, and thus the light is not detected by the light receiver 20. However, if the smoke particles flow into the detector, the light generated by the infrared light emitter 10 is scattered by the smoke particles, and then is input to the light receiver 20 to make the light receiver 20 react thereto.

Since the photoelectric type fire detector in the related art reacts to the particles in an aerosol state, it has the problem in that it reacts to not only the smoke caused by the fire but also the smoke, such as cooking smoke in a kitchen, cigarette smoke, water vapor, and fine dust, which may occur in everyday life, to cause the unwanted alarm to occur frequently.

In order to solve the above problem, an embodiment of the present disclosure may distinguish the fire smoke and non-fire quasi-smoke by using the characteristics of a plurality of wavelengths.

Figure 3:
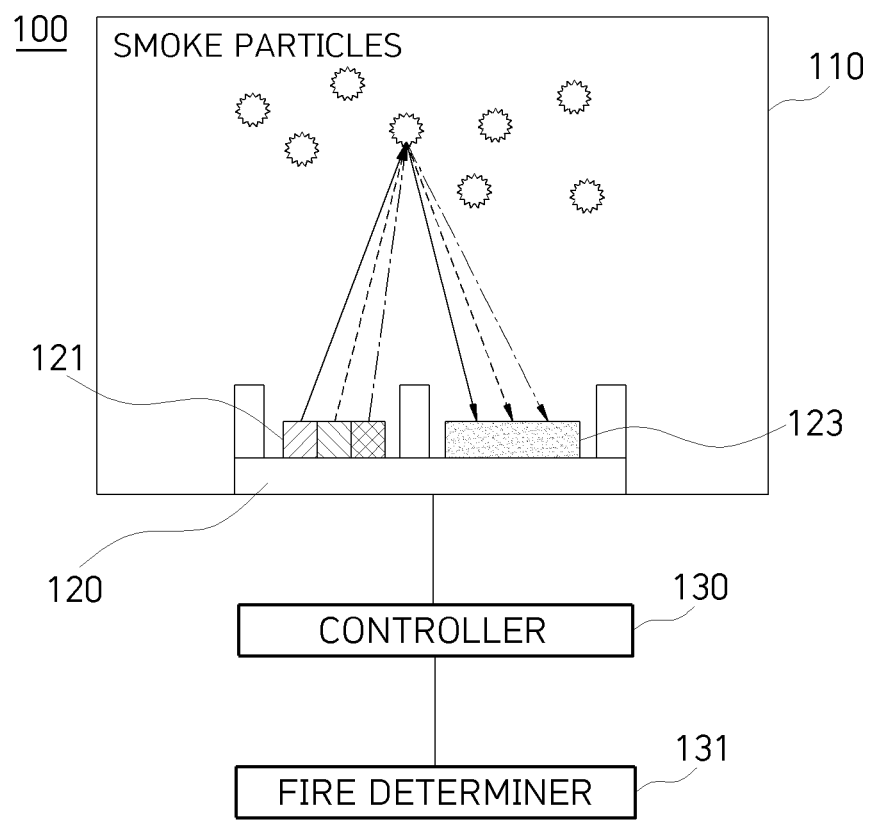
FIG. 3 is a diagram explaining a smoke detection apparatus based on multiple wavelengths according to an embodiment of the present disclosure.

FIG. 3 is a diagram explaining a smoke detection apparatus 100 based on multiple wavelengths according to an embodiment of the present disclosure.

The smoke detection apparatus 100 based on multiple wavelengths according to an embodiment of the present disclosure includes a chamber 110, a detector 120 including a light emitter 121 and a light receiver 123, and a controller 130.

In the chamber 110, a smoke detection space into which a smoke flows is formed, and light is radiated into the smoke detection space by the light emitter 121, the radiated light is scattered by the smoke, and then the scattered light is received by the light receiver 123.

The detector 120 includes the light emitter 121 and the light receiver 123. The light emitter 121 radiates the light having a plurality of different wavelengths into the space in the chamber 110. The light receiver 123 detects the light having the plurality of different wavelengths, being scattered by the smoke particles.

The controller 130 controls the operation of the detector 120 and distinguishes the fire smoke and the non-fire smoke by detecting and analyzing a light receiving signal of the light receiver 123.

In an embodiment of the present disclosure, the light emitter 121 may include a plurality of light sources configured to radiate the light having a plurality of different wavelengths, and the light receiver 123 may be configured to include at least one light receiver for distinguishing and receiving the plurality of wavelengths as the light having the plurality of wavelengths is radiated. Hereinafter, referring to FIGS. 4 to 6, the light emitter 121 and the light receiver 123 according to an embodiment of the present disclosure will be described.

Figure 4A:
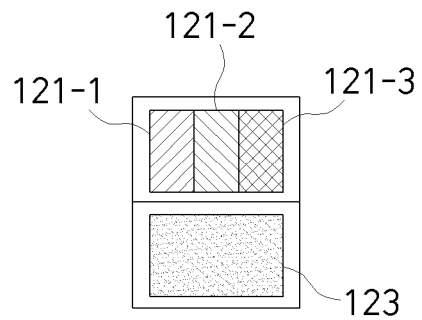
FIGS. 4A to 4C are diagrams illustrating a first embodiment of a light emitter and a light receiver in an embodiment of the present disclosure.
Figure 4B:
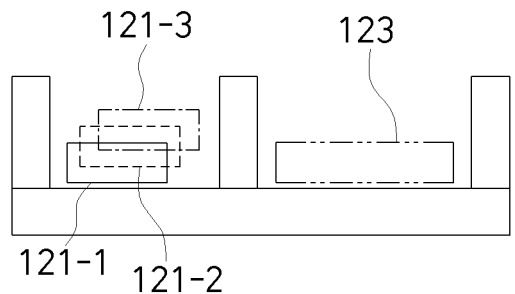
Figure 4C:
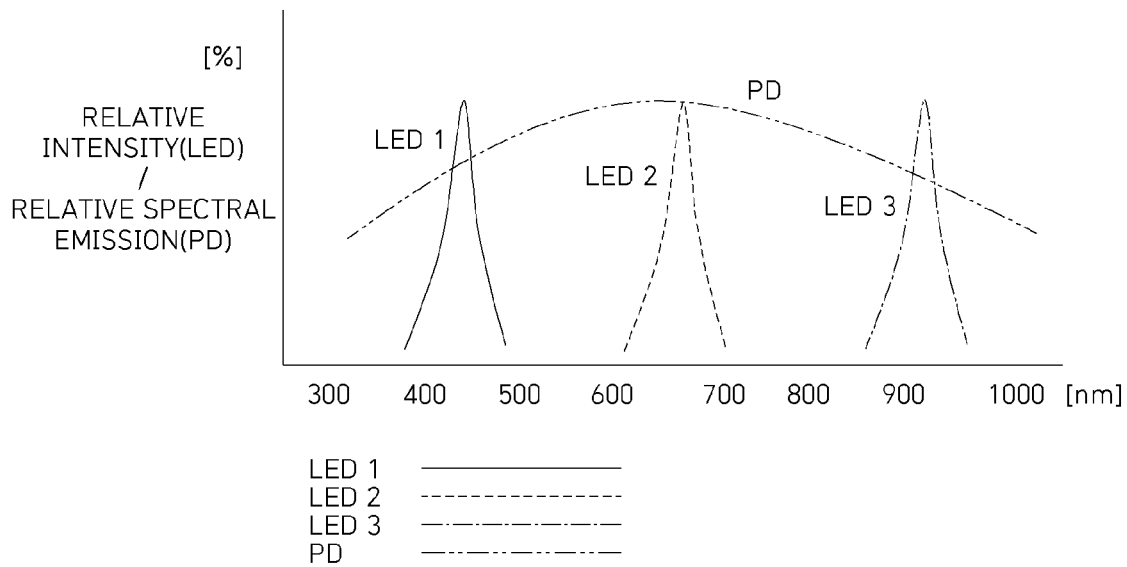

FIGS. 4A to 4C are diagrams illustrating a first embodiment of the light emitter 121 and the light receiver 123 in an embodiment of the present disclosure.

As an embodiment, the light emitter 121 may include a first light source 121-1 configured to radiate light having a first wavelength band of 380 to 480 nm, a second light source 121-2 configured to radiate light having a second wavelength band of 600 to 700 nm, and a third light source 121-3 configured to radiate light having a third wavelength band of 850 to 950 nm.

In response to this, the light receiver 123 may be composed of one photodiode configured to simultaneously receive the light of the first to third wavelength bands. In this case, as illustrated in FIG. 4B, between the light sources 121-1 to 121-3 and the light receiver 123 in the chamber, a partition for preventing light leakage, that is, for preventing the light generated from the light sources 121-1 to 121-3 from being detected by the light receiver 123, is provided.

The controller 130 may identify the change trend of the entire wavelength bands of the light receiving signal by analyzing the light receiving signal through one photodiode.

Meanwhile, in an embodiment of the present disclosure, the light emitter 121 and the light receiver 123 may be composed of a combination of separable components or one package.

Figure 5A:
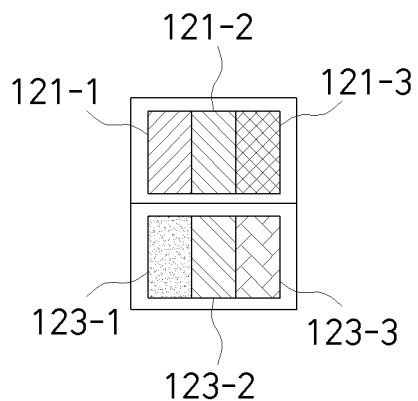
FIGS. 5A to 5C are diagrams illustrating a second embodiment of the light emitter and the light receiver in an embodiment of the present disclosure.
Figure 5B:
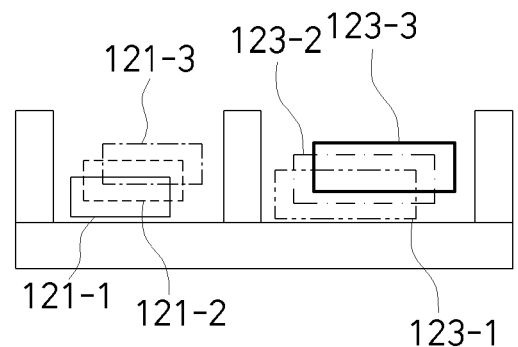
Figure 5C:
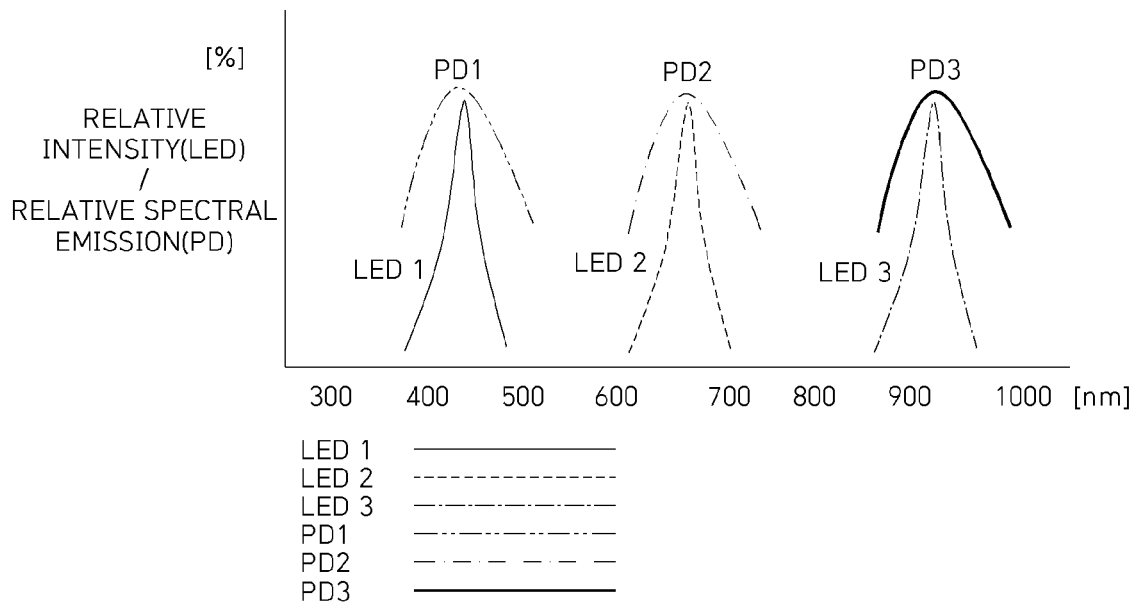

FIGS. 5A to 5C are diagrams illustrating a second embodiment of the light emitter 121 and the light receiver 123 in an embodiment of the present disclosure.

As an embodiment, the light emitter 121 may include first to third light sources 121-1, 121-2, and 121-3 having first to third wavelength bands, respectively, as illustrated in FIG. 4, and in response to this, the light receiver 123 may be composed of first to third photodiodes 123-1, 123-2, and 123-3 corresponding to the first to third wavelength bands, respectively.

In this case, as illustrated in FIG. 5B, between the light sources 121-1 to 121-3 and the first to third photodiodes 123-1 to 123-3 in the chamber, a partition for preventing light leakage is provided.

The controller 130 may identify the characteristics for each wavelength by analyzing the light receiving signals for the light radiated by the first to third light sources 121-1 to 121-3 through the plurality of photodiodes.

Meanwhile, in an embodiment of the present disclosure, the light emitter 121 and the light receiver 123 may be composed of a combination of separable components or one package.

Figure 6A:
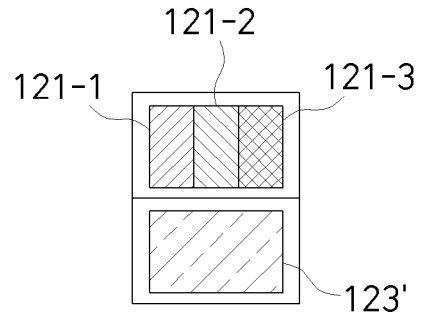
FIGS. 6A to 6C are diagrams illustrating a third embodiment of the light emitter and the light receiver in an embodiment of the present disclosure.
Figure 6B:
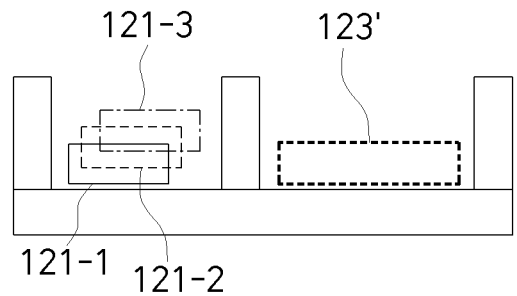
Figure 6C:
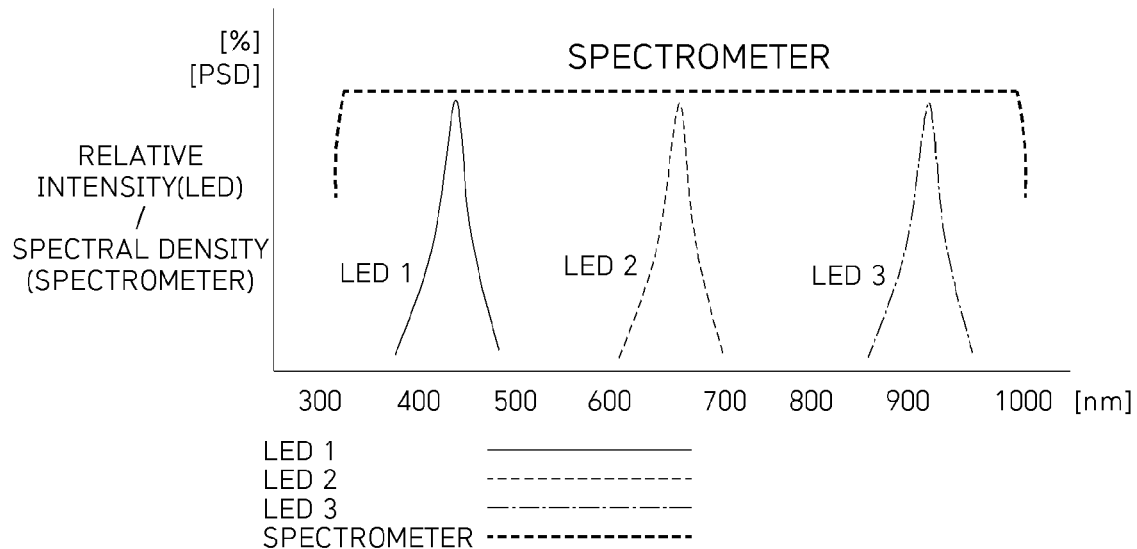

FIGS. 6A to 6C are diagrams illustrating a third embodiment of the light emitter 121 and a light receiver 123' in an embodiment of the present disclosure.

As an embodiment, the light emitter 121 may include first to third light sources 121-1, 121-2, and 121-3 having first to third wavelength bands, respectively, as illustrated in FIG. 4, and in response to this, the light receiver 123' may be composed of one spectrometer capable of simultaneously receiving the light having the first to third wavelengths. Meanwhile, although it is illustrated in FIG. 6A that the wavelength band of the spectrometer illustrated in FIG. 6A is 330 to 1000 nm, the wavelength band is not necessarily limited thereto.

In this case, as illustrated in FIG. 6B, between the light sources 121-1 to 121-3 and the light receiver 123' in the chamber, a partition for preventing light leakage is provided.

The controller 130 may identify the energy spectrum of the light receiving signal by analyzing the light receiving signal through the one spectrometer.

Meanwhile, in an embodiment of the present disclosure, the light emitter 121 and the light receiver 123' may be composed of a combination of separable components or one package.

Figure 7:
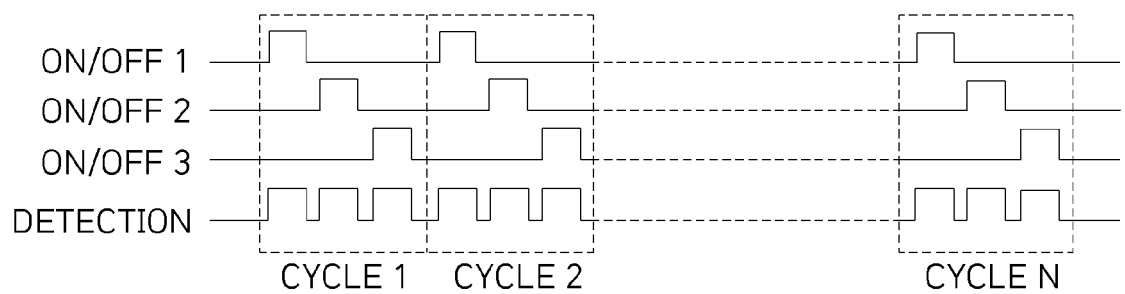
FIGS. 7 and 8 are diagrams explaining the control timing of the light emitter and the light receiver in an embodiment of the present disclosure.
Figure 8:
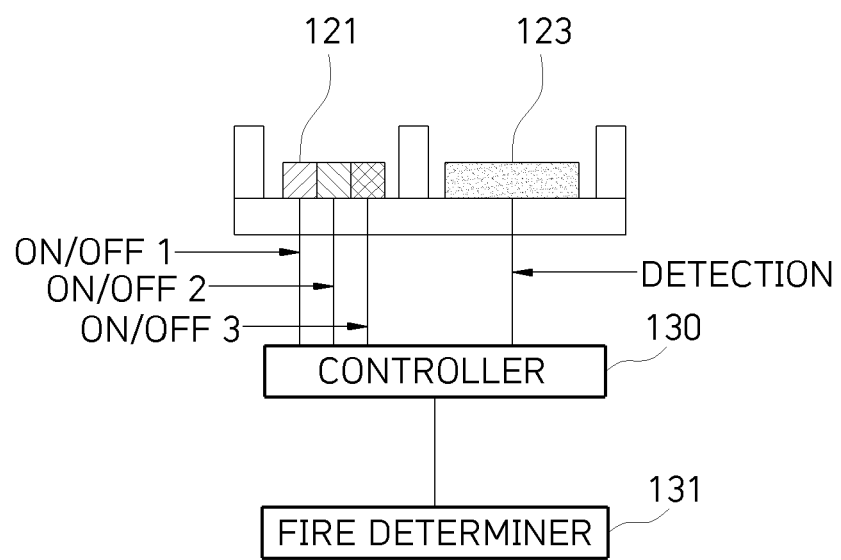

FIGS. 7 and 8 are diagrams explaining the control timing of the light emitter 121 and the light receiver 123 in an embodiment of the present disclosure.

As an embodiment, the controller 130 may control to turn on/off the first to third light sources 121-1 to 121-3 of the light emitter composed of three wavelengths. In this case, in order to prevent interferences from occurring among the plurality of wavelengths, the controller 130 may control the plurality of light sources 121-1 to 121-3 of the light emitter 121 to emit the light by differently setting the light emission time of the plurality of light sources 121-1 to 121-3 of the light emitter 121 in one period.

Further, the controller 130 measures the light receiving signals for the light having the respective wavelengths detected by the light receiver composed of one photodiode 123 according to the first embodiment (FIG. 4), three photodiodes 123-1 to 123-3 (FIG. 5) according to the second embodiment, or the spectrometer 123' according to the third embodiment. In this case, in order to prevent the interferences, the light emitter 121 radiates the light based on the light emission time differently set for the plurality of light sources, and the light receiver 123 detects the light receiving signal so as to correspond to the light emission time in the same period.

As described above, in order for the light emitter 121 and the light receiver 123 being controlled in one period to operate as the fire detector, the controller 130 repeatedly controls the light emitter 121 and the light receiver 123.

Meanwhile, in an embodiment of the present disclosure, the controller 130 may distinguish between the fire smoke and the non-fire quasi-smoke based on a ratio between detected values (hereinafter, wavelength detected values) of the light receiving signal per wavelength, being detected corresponding to the plurality of wavelengths.

That is, the controller 130 may determine the fire based on at least one of determination equation 1 to determination equation 3. In this case, determination equations 1 to 3 represent ratios of the detected values (wavelength detected values) of three wavelengths.

Determination equation 1=(second wavelength detected value)/(first wavelength detected value) [Determination equation 1]

Determination equation 2=(third wavelength detected value)/(second wavelength detected value) [Determination equation 2]

Determination equation 3=(third wavelength detected value)/(first wavelength detected value) [Determination equation 3]

Further, the controller 130 may distinguish between the fire smoke and the non-fire quasi-smoke based on a slope value in accordance with a first difference value between the plurality of wavelengths and a second difference value between the detected values of the light receiving signal per wavelength, being detected corresponding to the plurality of wavelengths.

That is, the controller 130 may determine the fire based on at least one of determination equation 4 to determination equation 6, and in this case, determination equations 4 to 6 represent values obtained by dividing differences (numerator) of the detected values of three wavelengths by differences (denominator) of wavelengths of three wavelength light sources.

Determination equation 4=((third wavelength detected value)−(first wavelength detected value))/((third wavelength)−(first wavelength))   [Determination equation 4]

Determination equation 5=((third wavelength detected value)−(second wavelength detected value))/((third wavelength)−(second wavelength))   [Determination equation 5]

Determination equation 6=((second wavelength detected value)−(first wavelength detected value))/((second wavelength)−(first wavelength))   [Determination equation 6]

Figure 9A:
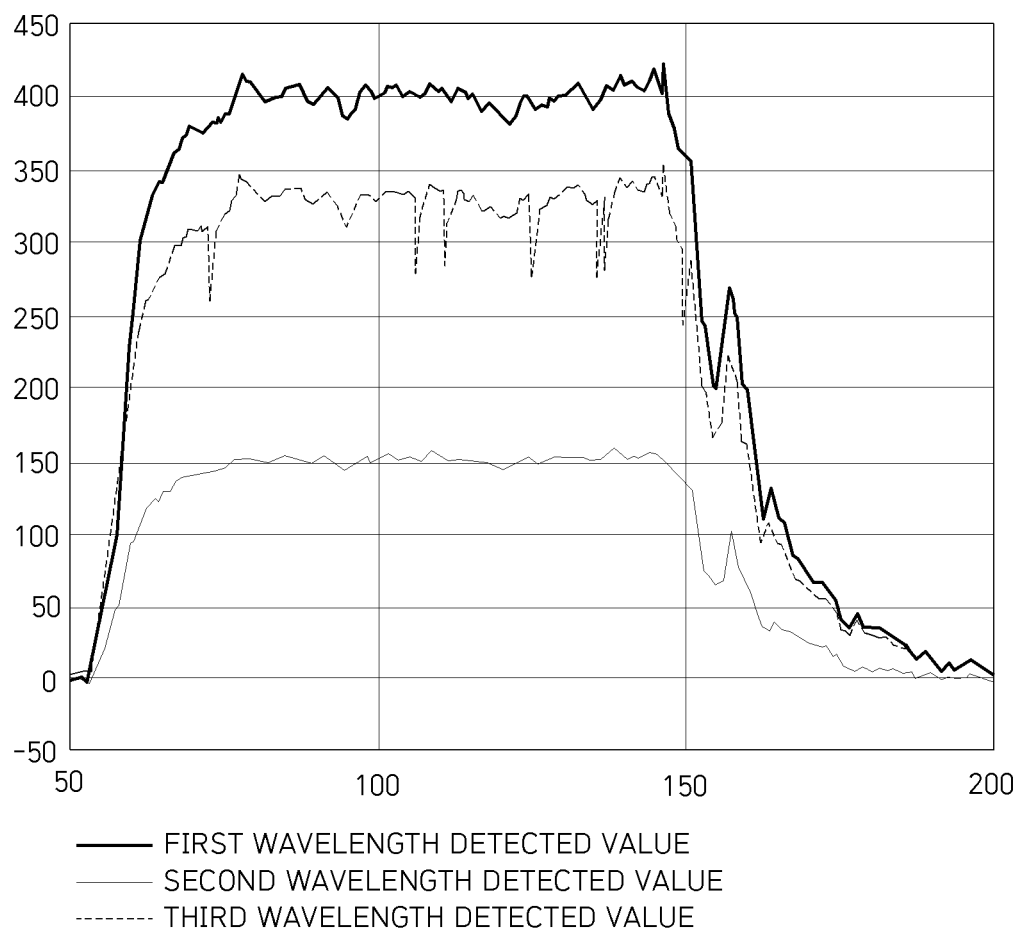
FIGS. 9A and 9B are schematic diagrams of determination equation 1 to determination equation 3.
Figure 9B:
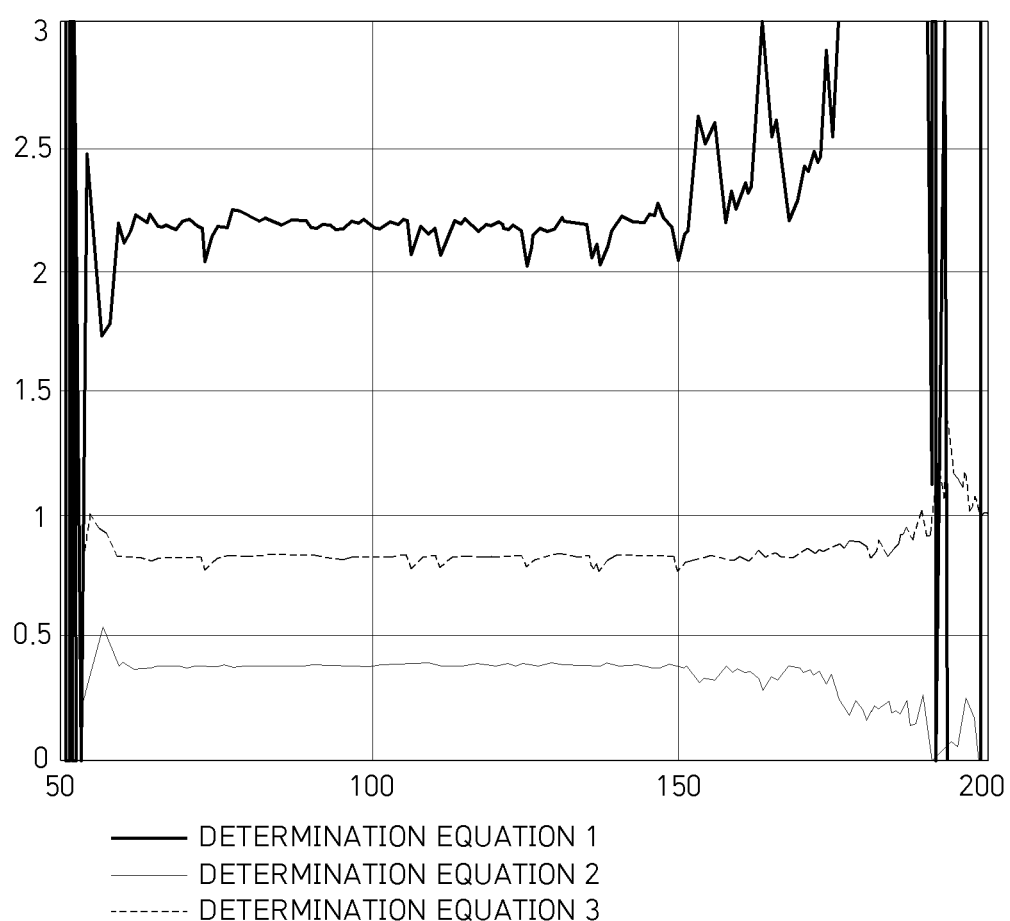

FIGS. 9A and 9B are schematic diagrams of determination equation 1 to determination equation 3.

In this case, a measured value illustrated in FIG. 9 is a value presented to help understanding for the determination equation, and thus the actual detected value may be different depending on the strength of the light source of the light emitter 121 and settings of a gain of an amplifier of the light receiver 123.

FIG. 9A shows the first wavelength detected value, the second wavelength detected value, and the third wavelength detected value measured over time. FIG. 9B is a graph presented by applying the first to third wavelength detected values of FIG. 9A to determination equations 1 to 3.

Referring to FIG. 9B, the values of determination equations 1 to 3 according to FIG. 9B may be different depending on the fire smoke and the non-fire quasi-smoke, which makes it possible to determine whether the fire occurs. In this case, the determination detected values corresponding to the non-fire quasi-smoke may be pre-tested and stored, and through comparison thereof, the fire smoke and the non-fire quasi-smoke may be distinguished.

Figure 10:
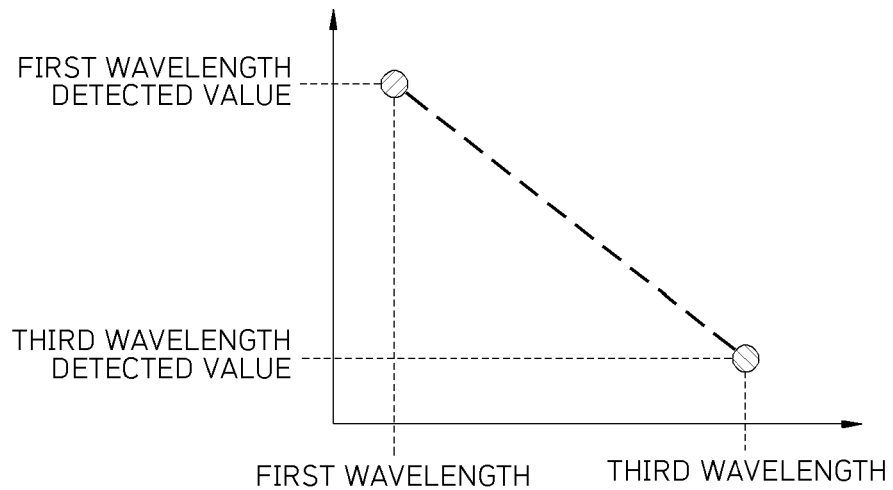
FIG. 10 is a schematic diagram of determination equation 4 according to an embodiment of the present disclosure.

FIG. 10 is a schematic diagram of determination equation 4 according to an embodiment of the present disclosure.

As described above, the controller 130 may distinguish between the fire smoke and the non-fire quasi-smoke based on a slope value in accordance with the first difference value between the plurality of wavelengths and the second difference value between the detected values of the light receiving signal per wavelength, being detected corresponding to the plurality of wavelengths. That is, since the slope value may differ depending on the particles caused by the fire smoke and the particles caused by the non-fire quasi-smoke, a fire determiner 131 of FIG. 7 may distinguish whether the fire occurs, based on the slope value. In this case, the fire determiner 131 may be configured to finally determine whether the fire occurs in case that the fire smoke and the non-fire quasi-smoke are distinguished from each other, and may be configured separately from the controller 130 or integrally with the controller 130.

Figure 11:
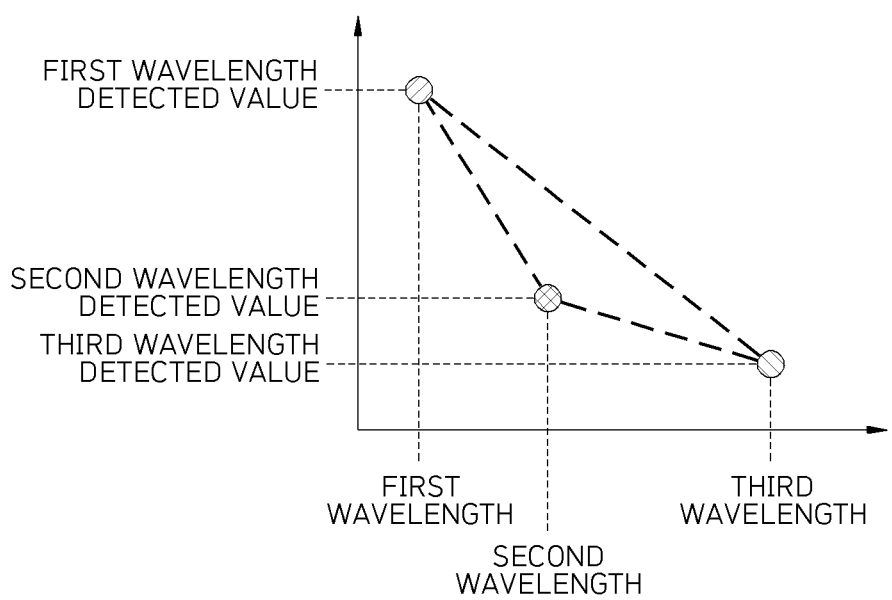
FIG. 11 is a schematic diagram using a combination result of determination equation 4 to determination equation 6 according to an embodiment of the present disclosure.

FIG. 11 is a schematic diagram using a combination result of determination equation 4 to determination equation 6 according to an embodiment of the present disclosure.

As an embodiment, the controller 130 may distinguish between the fire smoke and the non-fire quasi-smoke based on a combination result of a plurality of slope values calculated in accordance with the first difference value and the second difference value with respect to all of the plurality of wavelengths.

That is, the slopes may differently appear depending on the particles caused by the fire smoke and the particles caused by the non-fire quasi-smoke, and according to the present disclosure, the fire determiner 131 may finally determine whether the fire occurs by using the combination result thereof.

Figure 12:
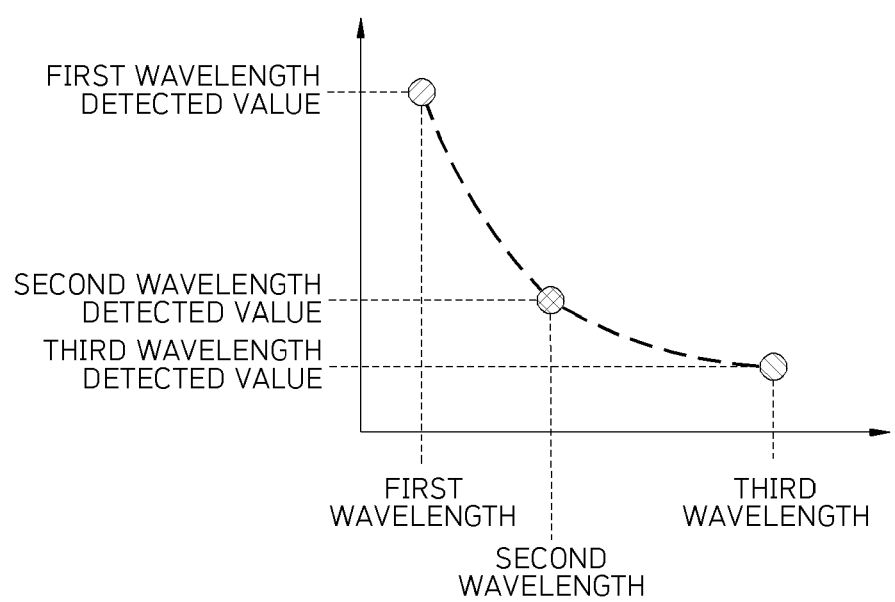
FIG. 12 is a diagram explaining determination as to whether smoke is fire smoke based on a non-linear slope value in an embodiment of the present disclosure.

FIG. 12 is a diagram explaining determination as to whether smoke is fire smoke based on a non-linear slope value in an embodiment of the present disclosure.

As an embodiment, the controller 130 may distinguish between the fire smoke and the non-fire quasi-smoke based on a non-linear slope value calculated based on a polynomial curve fitting algorithm with respect to all of the plurality of wavelengths and a detected value of the light receiving signal per wavelength, being detected corresponding to the all wavelengths.

That is, the non-linear slope value may be calculated by applying a specific polynomial curve fitting algorithm with respect to wavelength detected values measured by the light receiver 123 through the three wavelengths, and based on this, the fire smoke and the non-fire quasi-smoke may be distinguished from each other. In this case, the non-linear slope value depending on the fire smoke and the non-fire quasi-smoke may be pre-tested and stored, and during an actual operation, it may be possible to distinguish the fire smoke and the non-fire quasi-smoke and to determine whether the fire occurs, through the result of comparison with the stored data value.

Figure 13:
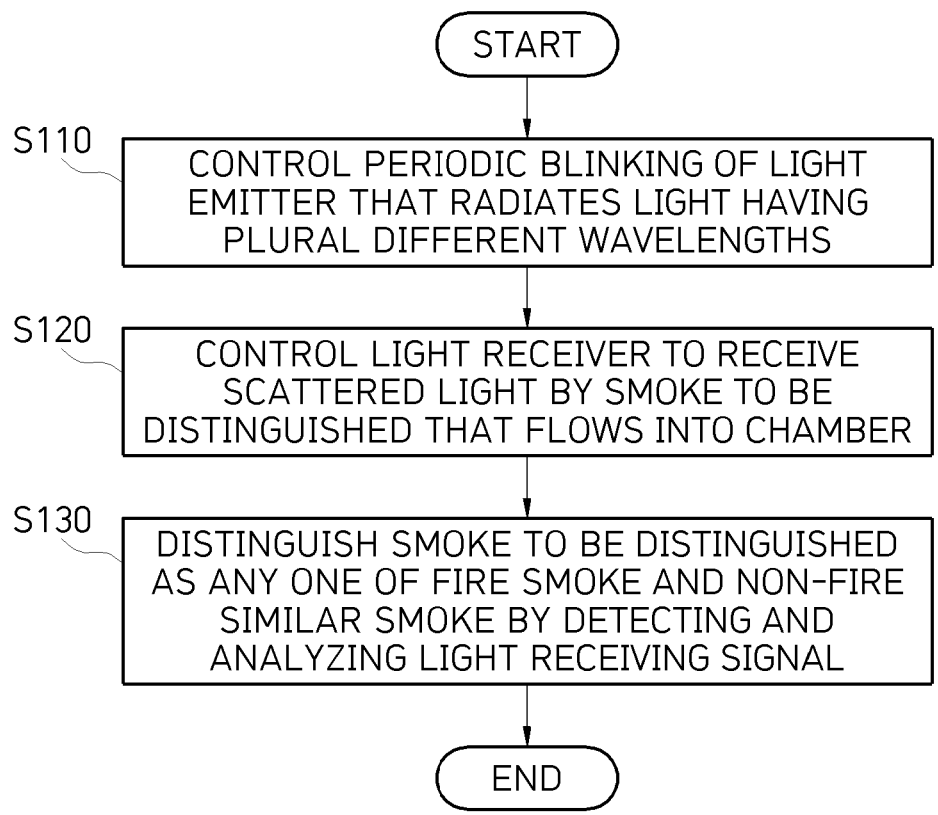
FIG. 13 is a flowchart illustrating a smoke detection method based on multiple wavelengths according to an embodiment of the present disclosure.

FIG. 13 is a flowchart illustrating a smoke detection method based on multiple wavelengths according to an embodiment of the present disclosure. Meanwhile, it may be understood that steps illustrated in FIG. 13 are performed by the smoke detection apparatus 100, but the present disclosure is not limited thereto.

First, the light emitter 121, which radiates light having a plurality of different wavelengths into a space in a chamber 110 into which smoke to be distinguished flows, is controlled to be periodically blinked (S110).

Next, the light receiver 123 is controlled to receive a scattered light by the smoke to be distinguished, having flowed into the chamber 110 (S120).

Next, the smoke to be distinguished is distinguished as any one of the fire smoke and the non-fire quasi-smoke by detecting and analyzing a light receiving signal of the light receiver 123 (S130).

Meanwhile, in the above description, steps S110, S120, and S130 may be further divided into additional steps or may be combined into fewer steps in accordance with an implementation example of the present disclosure. Further, as needed, some steps may be omitted, or the order of the steps may be changed. In addition, even in case of the omitted contents, the contents of the smoke detection apparatus 100 of FIGS. 3 to 12 may also be applied to the contents of FIG. 13.

FIGS. 14A to 14D are diagrams illustrating an example of a data processing procedure for determining whether a fire occurs. FIGS. 15A to 15F are diagrams illustrating an example of distribution characteristics of a histogram illustrated in FIG. 14D depending on a fire and a non-fire.

First, FIG. 14A shows a case where scattered values for smoke particles are measured and detected at a first wavelength of 450 nm and at a third wavelength of 870 nm.

Figure 14B:
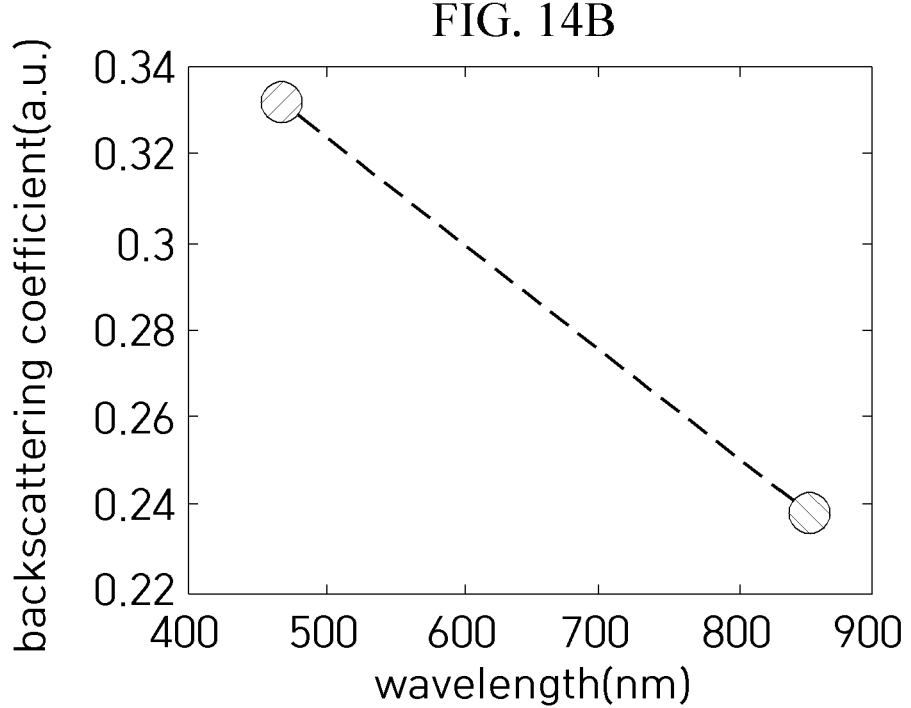

FIG. 14B is a graph showing a slope in a specific time zone, that is, the above-described determination equation 4, for the measured values in FIG. 14A.

Figure 14C:
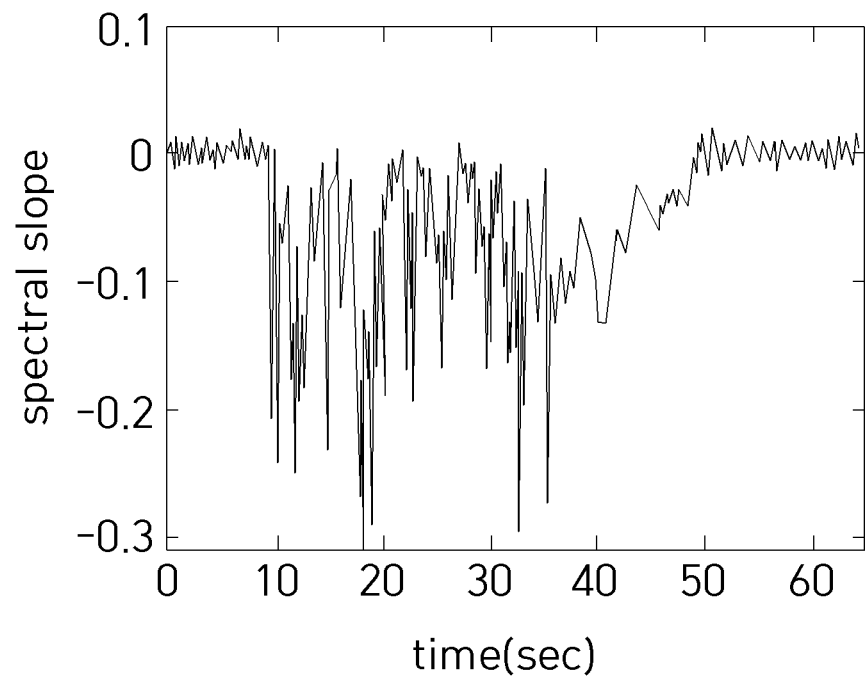

FIG. 14C is a graph showing slope values calculated by determination equation 4 for FIG. 14A.

Figure 14D:
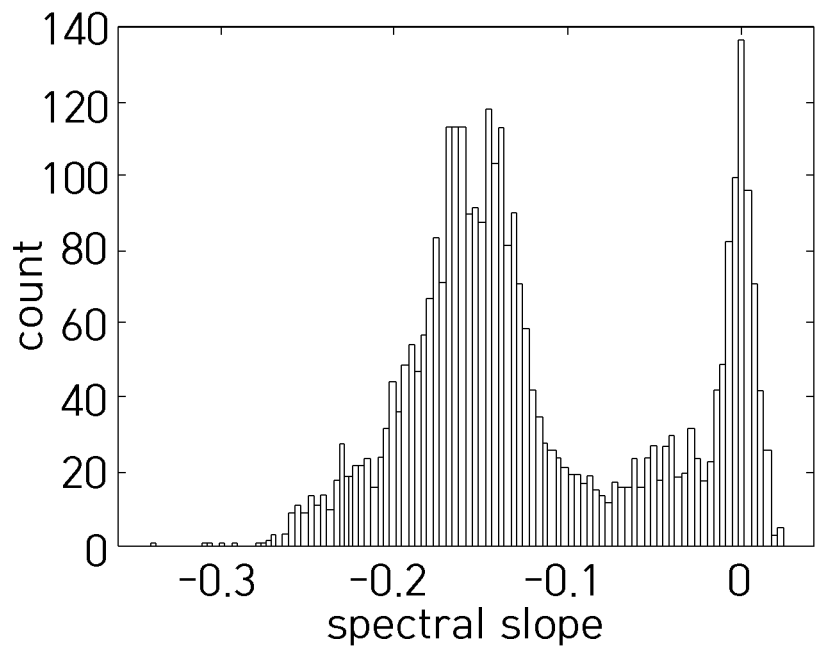
Figure 15A:
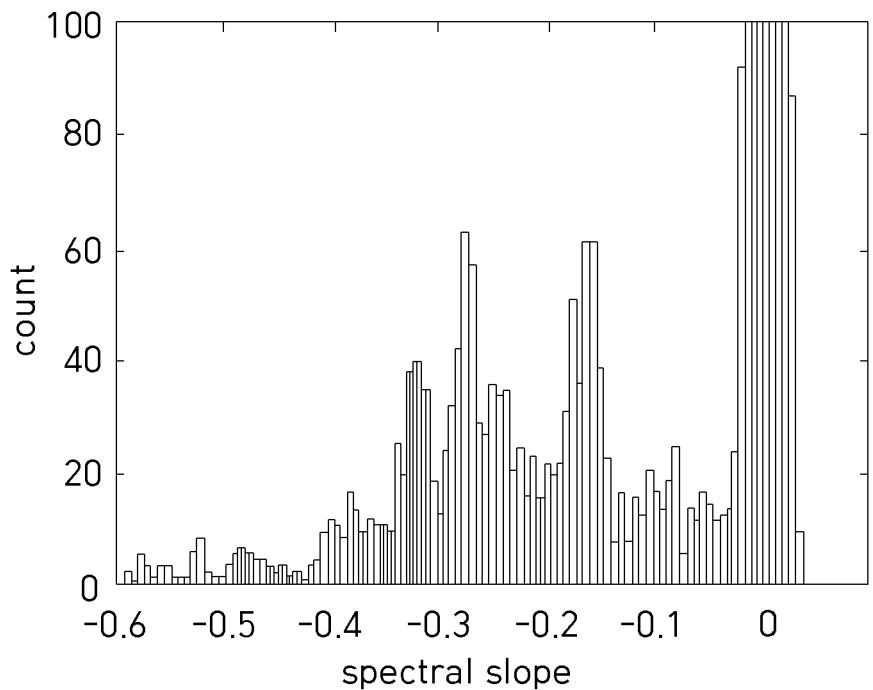
Figure 15C:
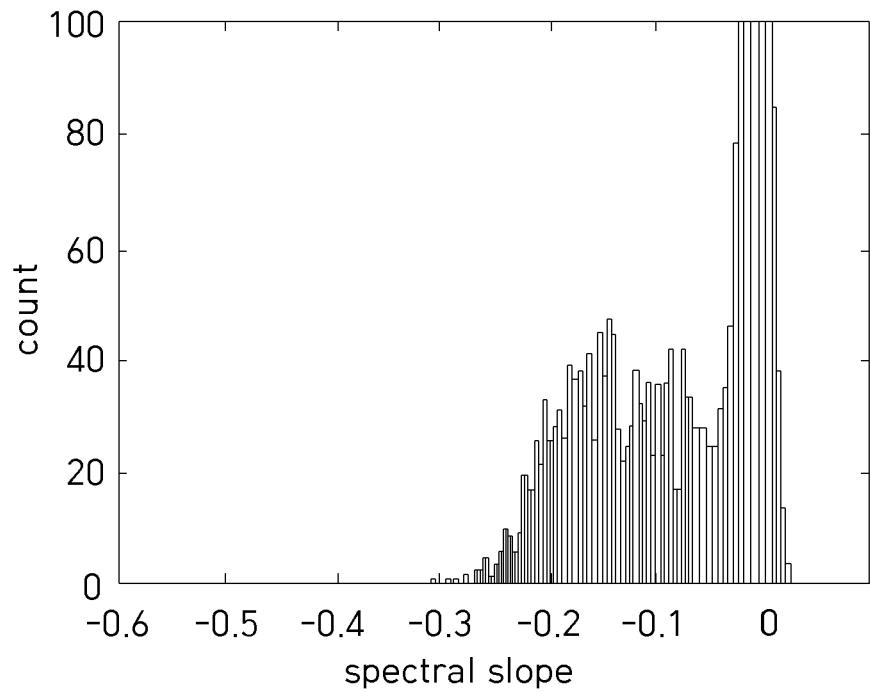
Figure 15D:
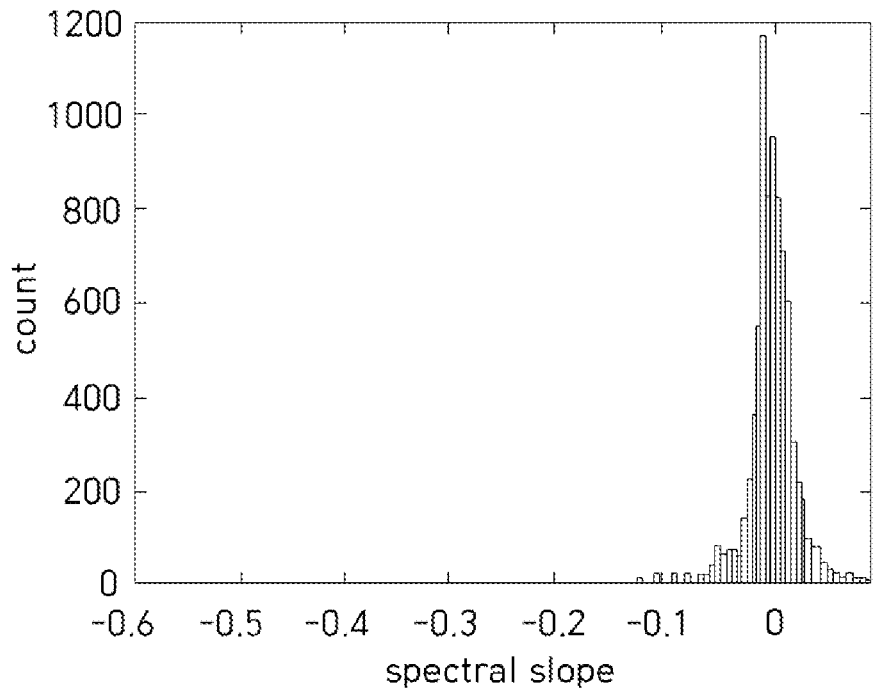
Figure 15F:
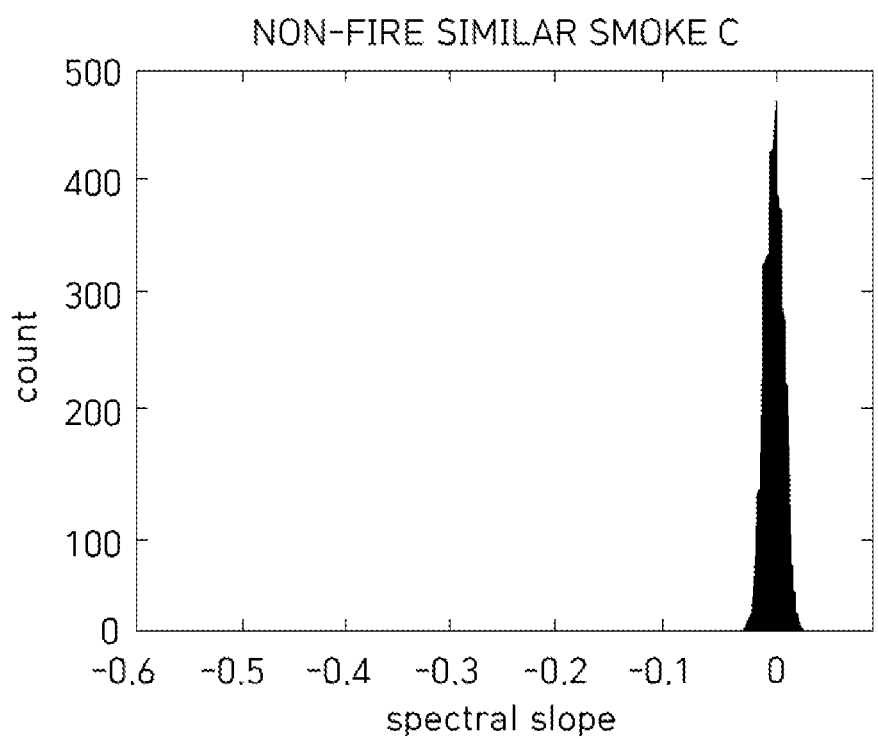

FIG. 14D is a histogram showing frequency distribution information for the slope values of FIG. 14C.

FIGS. 15A to 15F are diagrams illustrating an example of distribution characteristics of the histogram illustrated in FIG. 14D, which may differ depending on a fire and a non-fire.

According to an embodiment of the present disclosure, by using the smoke detection apparatus 100 that distinguishes between the fire and the non-fire based on the wavelengths, it is possible to prevent the firefighters from being mistakenly dispatched through reduction of the false alarm rate of the fire alarm, and thus expect the effect of increasing the public reliability on the fire alarm caused by the false alarm.

The smoke detection method based on the multiple wavelengths according to an embodiment of the present disclosure described above may be implemented as a program (or application) to be executed in combination with a hardware computer, and may be stored in a medium.

In order for the computer to read the above described program so as to execute the above methods, the program may include a code coded by a computer language, such as C, C++, JAVA, Ruby, and machine language, which can be read by a processor (CPU) of the computer through a device interface of the computer. Such a code may include a functional code related to a function that defines functions necessary to execute the above methods, and may include a control code related to an execution procedure necessary for the processor of the computer to execute the above functions according to a specific procedure. Further, such a code may further include additional information necessary for the processor of the computer to execute the above functions or a memory reference related code regarding at which location (address) of an internal or external memory of the computer the media is to be referred to. Further, in case that the processor of the computer is required to communicate with any other remote computer or server to execute the above functions, the code may further include a communication related code regarding how to communicate with any other remote computer or server by using a communication module of the computer, or which information or media is to be transmitted/received during the communication.

The storage medium means a medium which semi-permanently stores data and which can be read by a device, rather than a medium which stores data for a brief moment, such as a register, cache, or memory. Specific examples of the storage medium include ROM, RAM, CD-ROM, magnetic tape, floppy disc, and optical data storage device, but the present disclosure is not limited thereto. That is, the program may be stored in various recording media on various servers that can be accessed by the computer, or various recording media on a user's computer. Further, the media may be distributed in a computer system connected through a network, and may store a code that can be read by the computer in a distributed manner.

The above explanation of the present disclosure is for illustrative purposes, and it can be understood by those of ordinary skill in the art to which the present disclosure pertains that the present disclosure can be easily modified in other specific forms without changing the technical idea or essential features of the present disclosure. Accordingly, it should be understood that the above-described embodiments are illustrative in all aspects, not restrictive. For example, each constituent element explained as a single type may be distributed and carried out, and in the same manner, constituent elements explained as being distributed may be carried out in a combined form.

The scope of the present disclosure is defined by the appended claims to be described later rather than the above-described detailed description, and all changes or modifications derived from the meanings, scope, and equivalent concept of the claims should be interpreted as being included in the scope of the present disclosure.

What is claimed is:

1. A smoke detection apparatus, comprising:
a chamber configured to receive an inflow of a smoke;
a detector comprising a light emitter having a plurality of light sources configured to radiate light having a plurality of different wavelengths into a space in the chamber, and a light receiver configured to receive scattered light emitted by the plurality of light sources; and
a controller configured to control an operation of the detector and to distinguish between fire smoke and non-fire quasi-smoke by detecting and analyzing a light receiving signal of the light receiver,
wherein the light emitter comprises a first light source configured to radiate light having a first wavelength band of 380 to 480 nm, a second light source configured to radiate light having a second wavelength band of 600 to 700 nm, and a third light source configured to radiate light having a third wavelength band of 850 to 950 nm.

2. The smoke detection apparatus of claim 1, wherein the light receiver is composed of one photodiode or spectrometer configured to simultaneously receive the light having the first wavelength band, the second wavelength band, and the third wavelength band.

3. The smoke detection apparatus of claim 1, wherein the light receiver comprises a first photodiode, a second photo diode, and a third photodiode respectively corresponding to the first wavelength band, the second wavelength band, and the third wavelength band.

4. The smoke detection apparatus of claim 1, wherein in order to prevent interferences from occurring among the plurality of wavelengths, the controller is configured to: control the plurality of light sources of the light emitter to emit the light by differently setting light emission time of the plurality of light sources of the light emitter in one period, and control the light receiver to detect the light receiving signal so as to correspond to the light emission time.

5. The smoke detection apparatus of claim 1, wherein the controller is configured to distinguish between the fire smoke and the non-fire quasi-smoke based on a ratio between detected values of the light receiving signal per wavelength, being detected corresponding to the plurality of wavelengths.

6. The smoke detection apparatus of claim 1, wherein the controller is configured to distinguish between the fire smoke and the non-fire quasi-smoke based on a slope value in accordance with a first difference value between the plurality of wavelengths and a second difference value between detected values of the light receiving signal per wavelength, being detected corresponding to the plurality of wavelengths.

7. The smoke detection apparatus of claim 6, wherein the controller is configured to distinguish between the fire smoke and the non-fire quasi-smoke based on a combination result of a plurality of slope values calculated in accordance with the first difference value and the second difference value with respect to all of the plurality of wavelengths.

8. The smoke detection apparatus of claim 1, wherein the controller is configured to distinguish between the fire smoke and the non-fire quasi-smoke based on a non-linear slope value calculated based on a polynomial curve fitting algorithm with respect to all of the plurality of wavelengths and a detected value of the light receiving signal per wavelength, being detected corresponding to the all wavelengths.

9. A method performed by a smoke detection, the method comprising:
controlling periodic blinking of a light emitter that radiates light having a plurality of different wavelengths into a space in a chamber that receives an inflow of a smoke to be distinguished;
controlling a light receiver to receive scattered light by the smoke to be distinguished, having flowed into the chamber; and
distinguishing the smoke as any one of fire smoke and non-fire quasi-smoke by detecting and analyzing a light receiving signal of the light receiver,
wherein the controlling of the periodic blinking of the light emitter that radiates the light having the plurality of different wavelengths comprises controlling periodic blinking of a first light source configured to radiate light having a first wavelength band of 280 to 480 nm, a second light source configured to radiate light having a second wavelength band of 600 to 700 nm, and a third light source configured to radiate light having a third wavelength band of 850 to 950 nm.

10. The method of claim 9, wherein the controlling of the light receiver to receive the scattered light by the smoke to be distinguished, having flowed into the chamber, comprises receiving the light through the light receiver composed of one photodiode or spectrometer configured to simultaneously receive the light having the first wavelength band, the second wavelength band, and the third wavelength band.

11. The method of claim 9, wherein the controlling of the light receiver to receive the scattered light by the smoke to be distinguished, having flowed into the chamber, comprises receiving the light through the light receiver composed of a first photodiode, a second photodiode, and a third photodiode respectively corresponding to the first wavelength band, the second wavelength band, and the third wavelength band.

12. The method of claim 9, wherein the controlling of the periodic blinking of the light emitter that radiates the light having the plurality of different wavelengths comprises controlling the plurality of light sources of the light emitter to emit the light by differently setting light emission time of the plurality of light sources of the light emitter in one period in order to prevent interferences from occurring among the plurality of wavelengths, and
the controlling of the light receiver to receive the scattered light by the smoke to be distinguished, having flowed into the chamber comprises controlling the light receiver to detect the light receiving signal so as to correspond to the light emission time.

13. The method of claim 9, wherein the distinguishing of the smoke to be distinguished as any one of the fire smoke and the non-fire quasi-smoke by detecting and analyzing the light receiving signal of the light receiver comprises distinguishing between the fire smoke and the non-fire quasi-smoke based on a ratio between detected values of the light receiving signal per wavelength, being detected corresponding to the plurality of wavelengths.

14. The method of claim 9, wherein the distinguishing of the smoke to be distinguished as any one of the fire smoke and the non-fire quasi-smoke by detecting and analyzing the light receiving signal of the light receiver comprises distinguishing between the fire smoke and the non-fire quasi-smoke based on a slope value in accordance with a first difference value between the plurality of wavelengths and a second difference value between detected values of the light receiving signal per wavelength, being detected corresponding to the plurality of wavelengths.

15. The method of claim 14, wherein the distinguishing of the smoke to be distinguished as any one of the fire smoke and the non-fire quasi-smoke by detecting and analyzing the light receiving signal of the light receiver comprises distinguishing between the fire smoke and the non-fire quasi-smoke based on a combination result of a plurality of slope values calculated in accordance with the first difference value and the second difference value with respect to all of the plurality of wavelengths.

16. The method of claim 9, wherein the distinguishing of the smoke to be distinguished as any one of the fire smoke and the non-fire quasi-smoke by detecting and analyzing the light receiving signal of the light receiver comprises distinguishing between the fire smoke and the non-fire quasi-smoke based on a non-linear slope value calculated based on a polynomial curve fitting algorithm with respect to all of the plurality of wavelengths and a detected value of the light receiving signal per wavelength, being detected corresponding to the all wavelengths.

* * * * *